(12) United States Patent
Millington (10) Patent No.: US 12,142,155 B1
(45) Date of Patent: Nov. 12, 2024

(54) APPARATUS AND METHOD FOR SIMULATED ATHLETIC CONTACT TRAINING, TEACHING, AND ANALYSIS

(71) Applicant: Akim Kyle Millington, Tulsa, OK (US)

(72) Inventor: Akim Kyle Millington, Tulsa, OK (US)

(*) Notice: Subject to any disclaimer, the term of this patent is extended or adjusted under 35 U.S.C. 154(b) by 580 days.

(21) Appl. No.: 17/548,213

(22) Filed: Dec. 10, 2021

(51) Int. Cl.
| | |
|---|---|
| *G09B 9/00* | (2006.01) |
| *A63B 69/00* | (2006.01) |
| *G02B 27/01* | (2006.01) |
| *G06T 19/00* | (2011.01) |
| *G09B 19/00* | (2006.01) |

(52) U.S. Cl.
CPC ........ *G09B 19/0038* (2013.01); *A63B 69/002* (2013.01); *G02B 27/017* (2013.01); *G06T 19/006* (2013.01); *G09B 9/00* (2013.01); *G02B 2027/0178* (2013.01)

(58) Field of Classification Search
CPC ........ A63B 69/002; G06T 19/006; G09B 9/00
See application file for complete search history.

(56) References Cited

U.S. PATENT DOCUMENTS

| | | | |
|---|---|---|---|
| 4,268,917 A | 5/1981 | Massey | |
| 5,577,981 A | 11/1996 | Jarvik | |
| 6,152,854 A * | 11/2000 | Carmein | A63G 31/16 198/779 |
| 8,368,721 B2 | 2/2013 | McCoy | |
| 9,586,082 B2 | 3/2017 | Cranke et al. | |
| 10,586,469 B2 * | 3/2020 | Belch | G06V 40/23 |
| 10,617,911 B2 | 4/2020 | LoDuca | |
| 10,821,347 B2 | 11/2020 | Reilly et al. | |
| 11,173,376 B2 * | 11/2021 | Janssen | G09B 19/0038 |
| 2004/0116253 A1 * | 6/2004 | Radow | A63B 22/0235 482/8 |
| 2006/0116185 A1 | 6/2006 | Krull | |
| 2009/0046893 A1 * | 2/2009 | French | A63B 24/0021 382/103 |
| 2011/0270135 A1 * | 11/2011 | Dooley | G16H 50/30 600/595 |
| 2013/0095924 A1 * | 4/2013 | Geisner | A63F 13/21 463/32 |
| 2013/0244211 A1 * | 9/2013 | Dowling | G16H 20/30 434/247 |

(Continued)

FOREIGN PATENT DOCUMENTS

| | | |
|---|---|---|
| CN | 105467591 | 4/2016 |
| CN | 105976432 | 9/2016 |

(Continued)

*Primary Examiner* — Omkar A Deodhar
*Assistant Examiner* — S. N. H.
(74) *Attorney, Agent, or Firm* — Dennis D. Brown; Brown Patent Law, P.L.L.C.

(57) ABSTRACT

An augmented reality, mixed reality, virtual reality, and/or metaverse teaching, training, and analytical system for contact sports, such as American football, which (a) provides realistic interaction and physical engagement resistance with virtual opponents and objects in simulated game and practice settings, or with a virtual image of an actual opponent, but (b) eliminates the types of accidental or over-aggressive impacts and collisions which can cause ligament and joint damage, or produce concussions or other traumatic head injuries which can lead to conditions such as CTE (Chronic Traumatic Encephalopathy), dementia, and Alzheimer's.

21 Claims, 5 Drawing Sheets

(56) References Cited

U.S. PATENT DOCUMENTS

| | | | |
|---|---|---|---|
| 2020/0086199 A1* | 3/2020 | Reilly | G09B 19/0038 |
| 2020/0254300 A1 | 8/2020 | Khilmanovich et al. | |
| 2021/0370129 A1* | 12/2021 | Yang | A63B 22/0023 |
| 2022/0212086 A1* | 7/2022 | O'Dowd | G06F 3/04815 |

FOREIGN PATENT DOCUMENTS

| | | |
|---|---|---|
| CN | 106405845 | 2/2017 |
| CN | 106924969 | 7/2017 |

* cited by examiner

APPARATUS AND METHOD FOR SIMULATED ATHLETIC CONTACT TRAINING, TEACHING, AND ANALYSIS

FIELD OF THE INVENTION

The present invention relates to an apparatus and method for athletic training, teaching, and analysis in augmented reality, mixed reality, virtual reality, and/or metaverse settings which provide simulated physical contact resistance when engaging with virtual opponents or objects and provide competition, spectator, and entertainment options.

BACKGROUND OF THE INVENTION

A need exists for an interactive teaching, training, and analytical system for contact sports, such as American football, which (a) provides realistic interaction and physical engagement resistance with virtual opponents and objects in simulated game and practice settings to thereby (b) limit or prevent the types of accidental or over-aggressive physical contacts, impacts, and collisions which can cause ligament and joint damage, or produce concussions or other traumatic head injuries which can lead to conditions such as CTE (Chronic Traumatic Encephalopathy), dementia, and Alzheimer's.

A 2015 study reviewed the cause of death of every NFL player over the previous 95 years. Of the 26,702 athletes who had died, 26 committed suicide. This compares to an overall national rate of suicide in that same year of just 12.6 per 100,000. In other words, the suicide rate for the NFL football players was approximately 7.7 times the suicide rate for the general population.

The largest group of football players in the United States consists of youth players between the ages of 9 and 14. As compared to players in high school and college, youth players on average are more susceptible to concussions at lower levels of acceleration because the fatty myelin sheaths that help protect their brain cells are not yet fully formed. Additionally, differences in the anatomy and physiology of the youth players, such as head-neck proportions and brain development, also create a lower tolerance for head impacts.

In a study released in February of 2021, JAMA Neurology, a publication of the American Medical Association, tracked five years of practices and games at six Division I National Collegiate Athletic Association (NCAA) football programs. The study found that 77% of all concussions and 67% of the head impact hits experienced by the players in these football programs occurred in practice, not during game play. Moreover, almost ½ of all concussions and ⅔ of all high-impact hits to the head occurred during preseason training.

SUMMARY OF THE INVENTION

The present invention satisfies the needs and alleviates the problems discussed above. In one aspect, there is provided an apparatus for providing a simulated exercise with a virtual opponent or object, or providing a contest with a virtual image of an actual opponent, and providing simulated contact resistance, without actual contact or collisions, for teaching an individual a contact sport or contact sport position, performance training or analysis, or competition. By way of example, but not by way of limitation, the inventive apparatus and method are ideal for teaching, training, and developing the proper footwork, hand placement, head placement, and overall knowledge and understanding needed for playing offensive line positions and other positions in American football while minimizing or eliminating the risk of sustaining the types of joint and ligament damage, ACL and MCL tears, or concussions and other head injuries which commonly occur during actual practice and training sessions.

The apparatus preferably comprises: (a) an upper body harness or vest; (b) one or more hand or wrist retainers; (c) at least one resistance band, cord, or cable having a proximal end which is connected or linked to the upper body harness or vest and a distal end which is connected or linked to one or more of the hand or wrist retainers; (d) an augmented reality, mixed reality, or virtual reality headset: (e) one or more location or position sensors which sense, and transmit information pertaining to, a location or position of the upper body harness or vest, a left hand or left wrist of the individual, a right hand or right wrist of the individual, a left foot or left ankle of the individual, and/or a right foot or right ankle of the individual; and (f) an app or other computer program, downloaded into or otherwise at least partially stored in a portable or non-portable electronic device, which operates to automatically (i) directly or indirectly receive the information transmitted by each of the one or more location or position sensors and (ii) directly or indirectly control the augmented reality, mixed reality, or virtual reality headset to provide an image of a virtual opponent or object, or a virtual image of an actual opponent, for the simulated exercise or the contest.

While protecting the athlete from serious collision injuries, the inventive system will increase the athlete's skill level, muscle memory, and focus. In addition, using the information provided by the location or position sensors, the app or other computer program used in the inventive system can provide detailed analytics not only for review by the athlete, but also for review by, and for obtaining feedback from, coaches, peers, clinicians, therapists, or others. The inventive system can also be used for cross-training and for connecting with other amateur or professional athletes, athletic coaches, mental health coaches, and others. Moreover, the inventive system can be used in any room, gym, team facility, open training area, or other location which is clear of obstacles and hazardous objects.

As a further option, the inventive system is preferably programmed and configured to allow the athlete to post and share training sessions on social media and enjoy entertainment options such as: BLOCKCHAIN verified memorabilia auctions; competitive games within the Metaverse; and the ability to develop and distribute NFTs (Non-Fungible Tokens) (e.g., digital assets that represent real-world objects such as art, music, in-game items, GIF's, and videos). Such features will preferably operate on a token mechanized system, running on the Ethereum Blockchain, preferably allowing for all payment transactions in both Fiat and Cryptocurrency to be verified with the utilization of Smart Contracts.

As a further option, the inventive system is preferably programmed and configured so that the athlete will be able to customize the features of a virtual avatar which represents the athlete, such as, e.g., tattoos, clothing, cleats, and the athlete's training/practice gym. In addition, when arriving to compete against an opponent, the system will preferably be programmed and configured to allow the athletes to customize their stadium/arena arrival such as by, e.g., creating a 10-15 second clip of the athlete arriving in and then exiting a car, boat, or airplane en route to the entrance of a virtual and/or metaverse arena or stadium.

As a further option, the inventive system is preferably programmed and configured to select between a practice mode and a Go Live mode. In the practice mode, the athlete preferably competes against an AI-enabled computer within the athlete's personalized practice gym with the option of also including a virtual audience.

In the Go Live mode, the athlete competes against other athletes, including even competing in tournaments and prize matches. In such matches and events, all objects will preferably be fully customizable, including also providing sponsorship and advertisement opportunities and capabilities.

As a further option, the inventive system is preferably programmed and configured to provide access for guests and virtual fans to log in and view the competition. The guests and virtual fans will also preferably have the ability to vote on such things as: the stadium or arena for the competition; the specific match-ups of competitors; etc. The guests and virtual fans will can also have the ability to wager on the winner of a head-to-head match-up, the winner of a tournament, the athlete's performance on a specific obstacle course, etc.

Further aspects features and advantages of the present invention will be apparent to those in the art upon examining the accompanying drawings and upon reading the following detailed description of the preferred embodiments.

DETAILED DESCRIPTION OF THE PREFERRED EMBODIMENTS

Figure 1:
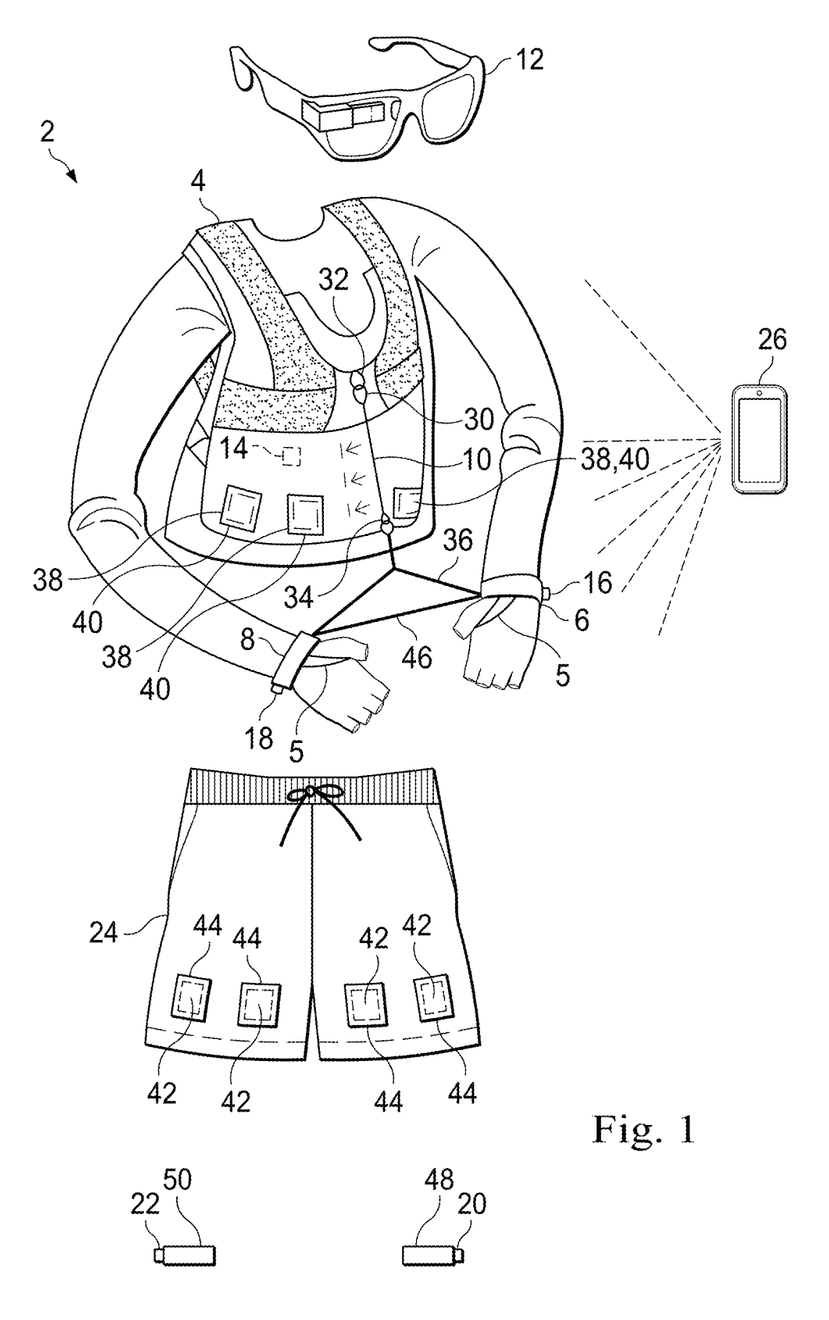
FIG. 1 is a front view of an embodiment 2 of the simulated training apparatus provided by the present invention.

An embodiment 2 of the simulated training apparatus provided by the present invention is illustrated in FIG. 1. The inventive apparatus 2 comprises: an upper body harness or vest 4; a left hand or wrist retainer 6; a right hand or wrist retainer 8; one or more resistance bands, cords, or cables 10 which extend between (i) the upper body harness or vest 4 and (ii) one or both of the left and right hand or wrist retainers 6 and 8; an augmented reality, mixed reality, or virtual reality headset 12; at least one body location or position sensor 14 which is preferably located in or attached to the upper body harness or vest 4; a left hand or wrist location or position sensor 16; a right hand or wrist location or position sensor 18; a left foot or ankle location or position sensor 20; a right foot or ankle location or position sensor 22; a pair of pants 24 or a belt; and a smart phone, tablet, laptop or other portable or non-portable electronic device 26 having an app or other computer program 28 for the inventive apparatus and method which is downloaded into or otherwise at least partially stored in the electronic device 26.

The resistance band, cord, or cable 10 used in the inventive apparatus 2 is preferably a resilient, stretchable band or cord having (a) a locking hook, swivel locking hook, carabiner, or other attachment device 30 on the proximal end of the band or cord 10 for releasably attaching the proximal end of the resilient, stretchable band or cord 10 to a loop or other attachment device 32 on the front of the upper body harness or vest 4 and (b) a locking hook, swivel locking hook, carabiner, or other attachment device 34 on the distal end of the band or cord 10 for releasably attaching the distal end of the resilient, stretchable band or cord 10 to a cord, cable, or other wrist or hand linking member 36 having a left end which is attached to the left hand or wrist retainer 6 and a right end which is attached to the right hand or wrist retainer 8. The resilient, stretchable band or cord 10 can be directly attached to both the upper body harness or vest 4 and the wrist linking member 36, or can be indirectly attached at either end using, e.g., an extension or other linking component.

Examples of resilient, stretchable bands or cords 10 suitable for use in the inventive apparatus 2 include, but are not limited to, bungee cords and paracords. The loop or other attachment device 32 on the upper body harness or vest 4 to which the proximal end 30 of the resilient, stretchable band or cord 10 is directly or indirectly attached will preferably be located at a height which will be in line with a horizontal thrusting or punching movement of the athlete's hands so that the resistance to forward movement provided by the resilient, stretchable band or cord 10 will best simulate the contact resistance which would be experienced by the athlete in an engagement with an actual opponent or object when pushing or punching horizontally or at any other upward or downward angle. For simulating engagements with opponents and objects of different size and/or momentum, as well as for other training purposes, the inventive apparatus 2 will also preferably include one or more additional resilient, stretchable bands or cords having greater and/or lesser degrees of stretch resistance for replacing the detachable band or cord 10.

The inventive apparatus 2 will also preferably include a plurality of weights 38 which can be selectively placed in pockets 40 provided on the upper body harness or vest 4 or can otherwise be held by or attached to the harness or vest 4. The weights 38 placed in or attached to the upper body harness or vest 4 can be selected to (i) correspond to the weight of the athlete's equipment and uniform in a real game situation, (ii) provide simulated resistance, and/or (iii) simulate the effects of fatigue and wear and tear on the body experienced throughout the course of an actual contest. In addition, weights 42 can be selectively placed in pockets 44 provided in the pants 24 (or a belt) of the apparatus 2 or can otherwise be held by or attached to the pants 24 or belt. By training under maximum pressure and resistance, the athlete will be mentally and physically stronger and will have better muscle memory during actual competition.

By way of example, but not by way of limitation, each of the left and right hand or wrists retainers 6 and 8 of the inventive apparatus 2 can comprise a hook and loop type (e.g., Velcro) band or strap which wraps around the athlete's wrist. As another example, each of the left and right hand or wrist retainers 6 and 8 can comprise a flexible or rigid wrist band or loop through which the athlete's hand is inserted and which further comprises a thumb loop or other thumb retainer 5 which receives the athlete's thumb. The thumb loops 5 hold the wrist bands or loops in place, provide stability, and will ensure that, when the athlete punches, the athlete's fists are up and close.

The inventive apparatus 2 preferably also comprises an adjustable linking element 46 which extends between the left hand or wrist retainer 6 and the right hand or wrist retainer 8 which adjustably limits the distance which the left and right hands, wrists, and retainers 6 and 8 can be separated from each other as the athlete's hands are thrust forward in a pushing or punching movement. For teaching and training purposes, the adjustable linking element 46 ensures that the athlete's hands (e.g., the hands of an offensive lineman) are the correct distance apart each time that the athlete strikes. The adjustable linking element 46 can be the linking member 36 to which the distal end 34 of the resilient, stretchable resistance band or cord 10 is releasably connected, or can be a different linking element. The adjustable linking element 46 will preferably be a non-stretchable band, cord, or strap formed of plastic, nylon webbing, or other suitable material.

The left hand or wrist location or position sensor 16 will preferably be located on or in the left hand or wrist retainer 6. Similarly, the right hand or wrist location or position sensor 18 will preferably be located on or in the right hand or wrist retainer 8. The left foot or ankle location or position sensor 20 will preferably be located on or in an ankle strap 48 which fits around the athlete's left ankle. The right foot or ankle location or position sensor 22 will preferably be located on or in an ankle strap 50 which fits around the athlete's right ankle. The body location or position sensor 14 will preferably be located on or in the back of the upper body harness or vest 4 in the lumbar region.

Examples of addition types of sensors which can be included on or in the upper body harness or vest 4 or elsewhere in the inventive apparatus 2 include, but are not limited to, (a) an accelerometer to track forward and back movements, sense gravity, and determine the body's orientation, (b) an electrodermal activity sensor to measure changes in conductivity produced in the skin due to increased activity of the sweat glands, and (c) a gyroscope to measure angular velocity and direction.

The readings taken by the location or position sensors 14, 16, 18, 20, and 22, and/or other sensors used in the inventive apparatus 2, will preferably be transmitted to the portable or non-portable electronic device 26 by Bluetooth or other wireless transmission.

The location and position sensors 14, 16, 18, 20, and 22, the additional sensors used in the inventive apparatus 2, and/or the app or other computer program 28 will preferably continuously detect or otherwise determine the positions of the athlete's upper body, left and right hands or wrists, left and right feet or ankles, head, etc. relative to a reference point, line, or object. For example, for an offensive lineman playing American football, the inventive apparatus 2 will preferably determine the position of the player's body, hands or wrists, feet or ankles, head, etc. relative to a virtual line of scrimmage.

As mentioned above, the headset 12 used in the inventive apparatus 2 can be any type of augmented reality, mixed reality, or virtual reality visual device. The headset 12 will preferably be directly or indirectly linked to the portable or non-portable electronic device 26 by Bluetooth or other wireless transmission system. If an augmented reality or mixed reality headset 12 is used, the athlete will see an overlay of the images and information generated by the app or other computer program 28, and/or by the headset 12 itself, in the athlete's actual setting. If a virtual reality headset 12 is used, the athlete will be visually transported to an entirely virtual world (e.g., a football stadium) generated by the app or other computer program 28, and/or by the headset 12.

Although virtual reality headsets offer some immersion advantages for tutorial modes, as well as learning modes such those which might assist an offensive lineman in learning and recognizing defensive schemes, formations, and concepts, the headset 12 used in the inventive apparatus 2 will preferably be an augmented reality or mixed reality headset. When using an augmented reality or mixed reality headset 12, the athlete can view the athlete's own feet, footwork, hand placement and real time sensory information such as punch speed, angle and direction, foot speed, distance, and direction.

The app or other computer program 28 used for controlling the inventive apparatus 2 can be downloaded or otherwise stored in its entirety in the smart phone, tablet, laptop, or other electronic device 26. Alternatively, a portion of the app or other computer program 28 can be located, and some of the operations and/or storage of the app or other computer program 28 can be done, for example, in the Cloud, in a server, and/or in one or more other computer storage and/or operating components located in the headset 12, the upper body harness or vest 4, or elsewhere in the inventive apparatus 2.

Figure 2:
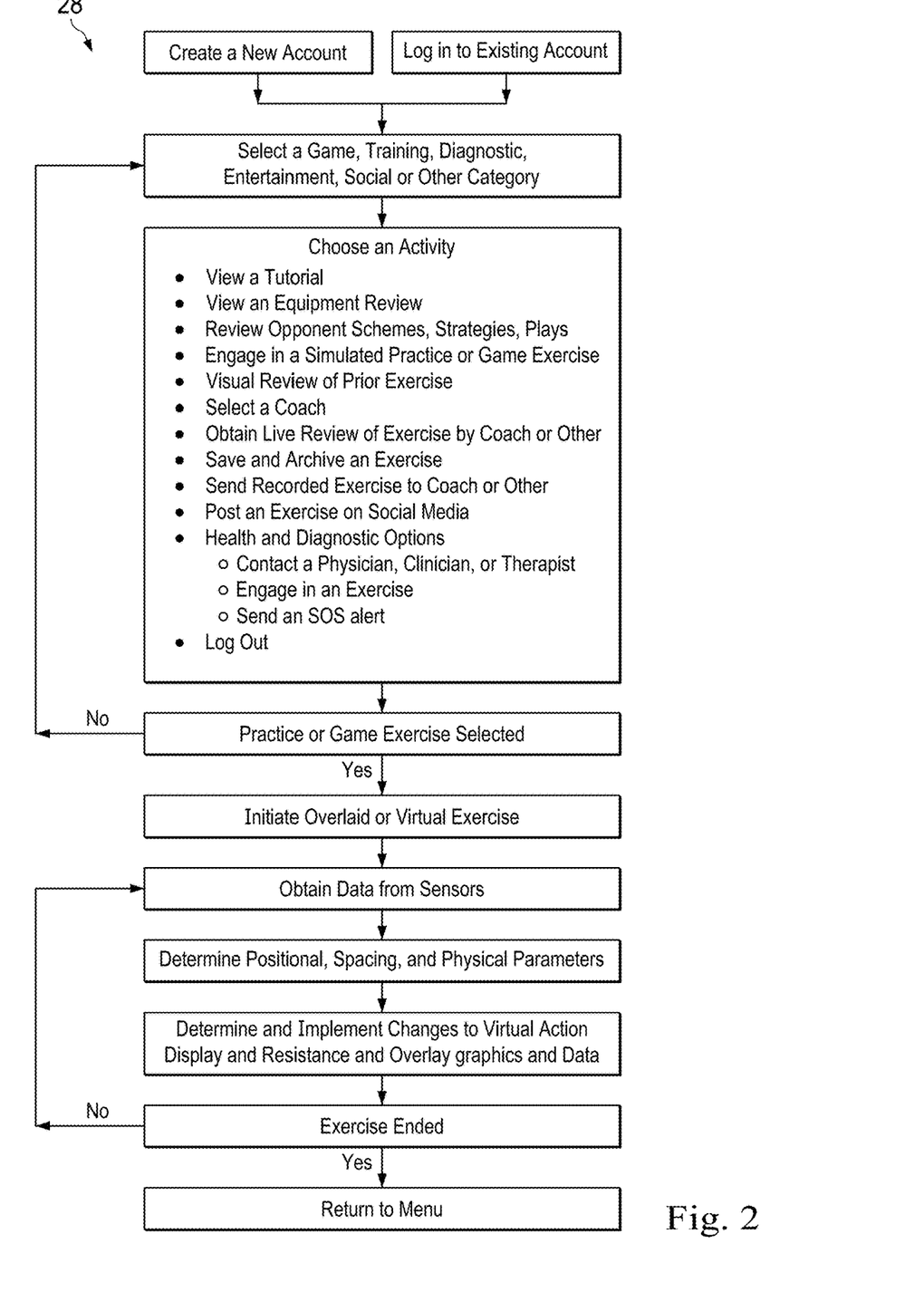
FIG. 2 is a flow chart for an app or other computer program 28 used in the apparatus and method of the present invention.

In the method of the present invention as illustrated in FIG. 2, and as embodied in and performed using the app or other computer program 28 and the other components of the inventive apparatus 2, the athlete will preferably use the athlete's smart phone or other electronic device 26 to first set up a personal account by (1) entering an account name and password for logging into the account, (2) entering personal and biometric information such as the athlete's name, age, location, relevant background and experience level, height, weight, dominant hand, hand size, forty-yard dash time, ten-yard dash time, etc., (3) creating an Avatar to represent the athlete in virtual scenarios (including the ability to purchase apparel and accessories for the Avatar), and (4) entering payment account information for purchases.

Figure 3:
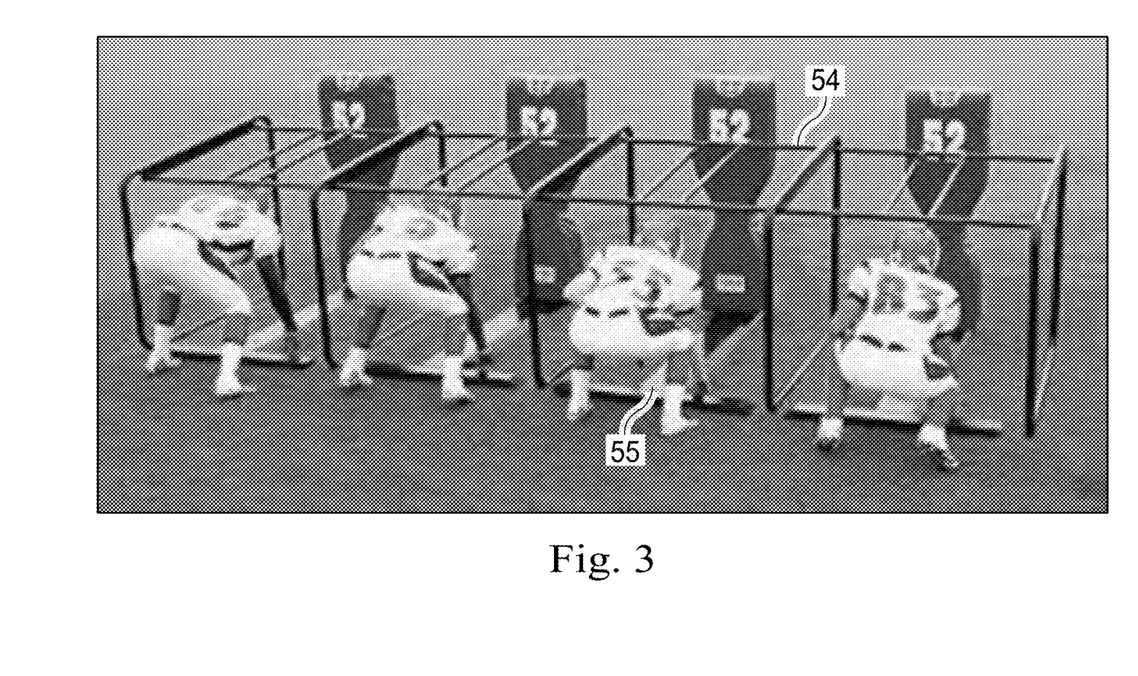
FIG. 3 is an example of a virtual equipment review image used in the apparatus and method of the present invention.

After the athlete sets up a new account or logs in to an existing account, the athlete will preferably then use the athlete's electronic device 26 to access a menu of game, training, diagnostic, and/or other exercises and select a category (e.g., run blocking, pass blocking, punt kicking team blocking, and/or field goal kicking team blocking) which is of interest to the athlete. The athlete will then choose a particular learning, training, diagnostic, or other activity within the selected category. Examples of such activities and options preferably include, but would not be limited to: (a) a tutorial mode stored in the inventive system in which the athlete will watch a virtual Avatar perform the exercise correctly with pop-up information and pointers which also guide the athlete in best practices; (b) a virtual review of the digital training equipment used in a selected simulation (such as, e.g., a virtual training shoot 54 as illustrated in FIG. 3 to teach the athlete to stay low during a block, or digital foot placement boards 55 on the ground to simulate a wide stance and a proper base for blocking); (c) a review of an opponent's possible, schemes, strategies, plays, etc. in which the athlete can highlight a specific player to learn how to best engage the player; (d) selecting and engaging in a simulated practice exercise, game exercise, or diagnostic exercise which may involve simulated engagement with an opponent or object; (e) saving and archiving a digital copy of the exercise; (f) watching a visual review of the previous or other prior exercise with digital analytics; (f) choosing a digital view and critique option in which a coach or other person can virtually join an exercise as an observer, receive and observe a recorded exercise, and/or provide instructions and advice; and (g) posting the recorded exercise on social media or sending the recorded exercise to others.

For engaging in simulated practice, game, or diagnostic exercises, the app or other computer program 28 will determine and control the movement and reaction of the virtual opponent, object, or other image which is presented to the athlete by the headset 12 based upon preset algorithms and routines and preferably also using the information transmitted by the location or position sensors 14, 16, 18, 20, and 22, as well as any other sensors used in the inventive apparatus 2. To provide more realistic and better exercise simulations, the app or other computer program 28 utilizes machine learning or other artificial intelligence programming which learns from the athletes moves, mistakes, and habits and challenges them as the exercise continues, or when the exercise is repeated.

For head-to-head match-ups and tournaments, the athlete can compete with actual opponents who are also wearing an inventive apparatus 2 and who perform the same exercises against the same virtual opponents or objects.

As another alternative, the athlete can engage in a direct competition with a virtual image of an actual opponent who is also wearing an inventive apparatus 2, wherein the opponent's actual moves and hand, feet, and body positions, in the form of the virtual image of the opponent, will be transmitted to the athlete's headset and information from the system sensors, as well as the physical information input by the opponent, can be used to control the resistance experienced by the athlete and other parameters of the contest, particularly if the athlete is using an embodiment 60 of the inventive system as described below.

The app or other computer program 28 also operates to automatically (i) determine and store a record of the relative position and spacing data during the simulated exercise for two or more or all of the upper body, the head, the left hand or left wrist, the right hand or right wrist, the left foot or left ankle, and the right foot or right ankle of the individual, (ii) determine the speed, acceleration force exerted, and/or vertical jumping distance of the athlete during the simulated exercise, (iii) determine the head placement of the athlete during the simulated exercise, (iv) include in the playback of the simulated exercise a footwork update or map showing positive and negative steps toward the play. (v) determine whether a head impact or other potentially harmful impact would have occurred in an actual practice or competition setting and the force of the impact, and (vi) determine a visual recognition rating and/or a memory processing rating for the athlete.

Using the electronic device 26, the app or other computer program 28 also gives the athlete the ability to: (1) select a coach, peer, or mentor, schedule a simulated exercise session, follow-up with an email, and conduct and save the simulated session; (2) view, schedule, conduct, sponsor, and save clinics; (3) view and participate in memorabilia auctions (e.g., verified BLOCKCHAIN auctions) and other entertainment options; (4) select and contact a mental health coach, clinician, or physician and schedule a session; (5) send an SOS alert or request to which a mental health coach, clinician, or physician will respond; and (6) connect with other athletes who also use the inventive system.

For improved physical and mental health and wellbeing, the app or other computer program 28 of the inventive system also enables the athlete to select and conduct or participate in: (a) exercises and games for improved sleep, athletic vision, and muscle memory; (b) at home self-assessments which will be evaluated by physicians, clinicians, or others for counselling purposes and will enable the physicians or clinicians to view sleep and stress patterns; and (c) games and exercises which measure the cerebral "base line" of the athlete.

Figure 4:
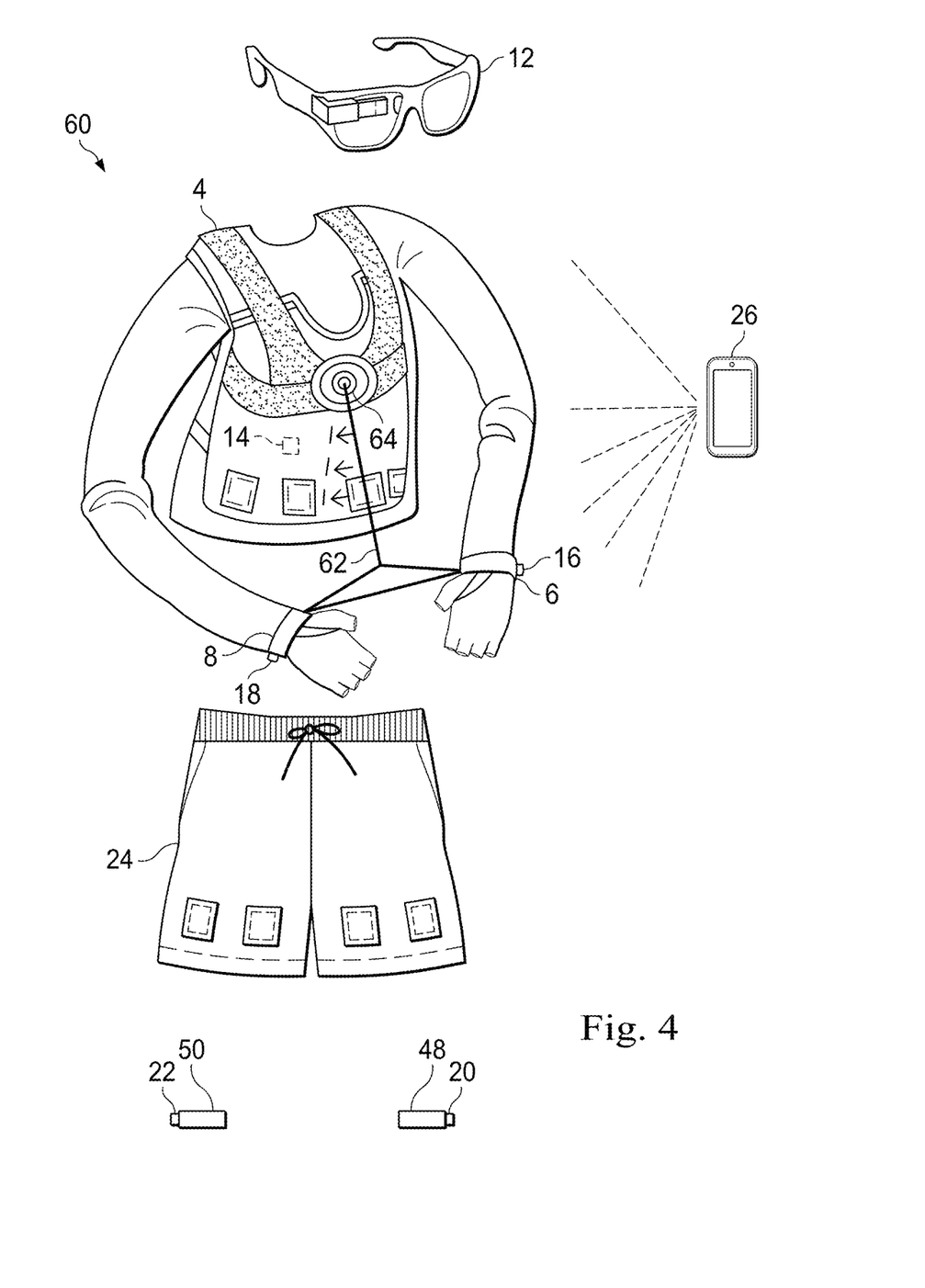
FIG. 4 is a front view of an alternative embodiment 60 of the simulated training apparatus provided by the present invention.
Figure 5:
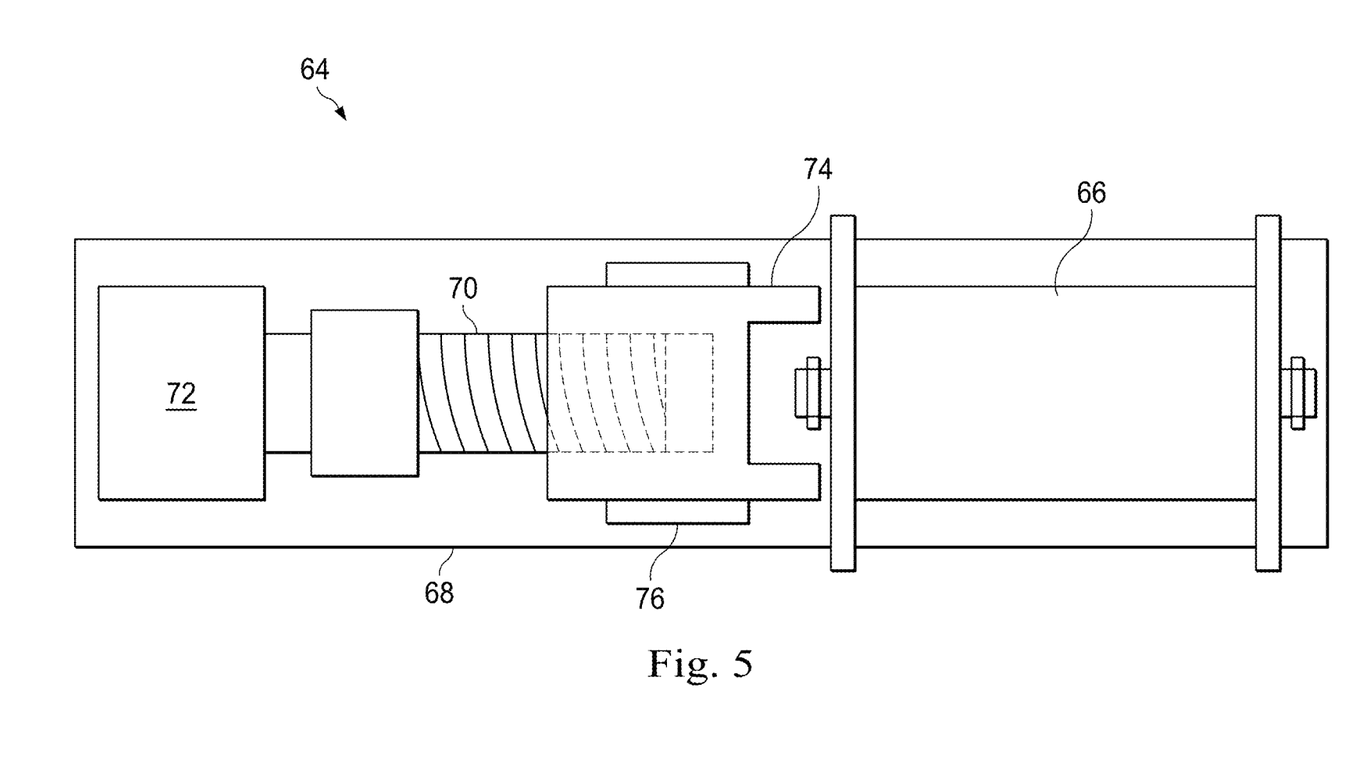
FIG. 5 schematically illustrates an automated contact resistance assembly 64 used in the inventive simulated training apparatus 60.

An alternative embodiment 60 of the simulated training apparatus provided by the present invention is illustrated in FIGS. 4 and 5. The inventive apparatus 60 is preferably substantially identical to the inventive apparatus 2 except that the proximal end of the resistance band, cord, or cable 62 of the inventive apparatus 60 is connected to an automated contact resistance assembly 64 which comprises (i) a winding element 66 (e.g., preferably a self-winding element such as a spring-loaded spool), held by the upper body harness or vest 4, to which the proximal end of the resistance band, cord, or cable 62 is connected and around which the resistance band, cord, or cable 62 is wound as the athlete's hands and wrists move rearwardly toward the upper body harness or vest 4 of the inventive apparatus 60 and (ii) an automated resistance mechanism 68, controlled by the app or other computer program 28, which automatically applies resistance to the winding element 66 or the resistance band, cord, or cable 62 as the athlete's hands move forward, away from upper body harness or vest 4, into engagement with a virtual opponent or object in a simulated exercise.

By way of example, but not by way of limitation, the automated resistance mechanism 68 can comprise: a bolt or screw 70 which is rotated by an automated, reversible electric motor 72; a braking element 74 which is threadedly received on the bolt or screw element 70; a track 76 which prevents the braking element 74 from rotating and guides the braking element 74 in a linear sliding movement forwardly into contact with the winding element 66 and rearwardly out of contact with the winding element 66 as the bolt or screw 70 is rotated by the reversible motor 72; and a battery for powering the automated electric motor 72. The resistance band, cord, or cable 62 used in the inventive apparatus 60 is preferably a steel wire cable having a plastic or rubber covering.

When engaging in simulated practice, game, or diagnostic exercises, the app or other computer program 28 automatically operates the reversible electric motor 72 to control the amount of variable resistance applied to the winding element 66 by the braking element 74. To continuously determine and apply the appropriate amount of resistance to the winding element 66 for the simulated exercise, the app or other computer program 28 uses (a) the information transmitted by sensors 14, 16, 18, 20, and 22 regarding the locations or positions of the athlete's body, hands or wrists, and feet or ankles, (b) the nature (e.g., the simulated weight, size, etc.), movements, and actions of the virtual opponent or object as it is engaged by the athlete, (c) the information and data received from other sensors used in the inventive apparatus 60, and (d) the physical parameters, as discussed above, which are calculated for the athlete by the app or other computer program from the data received. To provide more realistic and better control of the automated resistance mechanism 68 in conjunction with the other features and components of the simulated exercise, the app or other computer program 28 will preferably use machine learning or other artificial intelligence programming which learns from the athletes moves, mistakes, and habits and challenges them as the exercise continues, or when the exercise is repeated.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. An apparatus for providing a simulated exercise with a virtual opponent or object, or providing a contest with a virtual image of an actual opponent, and providing simulated contact resistance, without actual contact or collisions, for teaching an individual a contact sport or contact sport position, performance training or analysis, or competition, the apparatus comprising:
    an upper body harness or vest for the upper body of the individual;
    one or more hand or wrist retainers;
    at least one resistance band, cord, or cable having (i) a proximal end which is connected or linked to the upper body harness or vest and (ii) a distal end which is connected or linked to one or more of the one or more hand or wrist retainers;
    an augmented reality, mixed reality, or virtual reality headset;
    one or more location or position sensors which sense, and transmit information pertaining to, a location or position of the upper body harness or vest, a left hand or left wrist of the individual, a right hand or right wrist of the individual, a left foot or left ankle of the individual, and/or a right foot or right ankle of the individual;
    an app or other computer program, downloaded into or otherwise at least partially stored in a portable or non-portable electronic device, which operates to automatically (i) directly or indirectly receive the information transmitted by each of the one or more location or position sensors and (ii) directly or indirectly control the augmented reality, mixed reality, or virtual reality headset to provide an image of a virtual opponent or object, or a virtual image of an actual opponent, for the simulated exercise or the contest;
    a winding element, held by the upper body harness or vest, to which the proximal end of the at least one resistance band, cord, or cable is attached and around which the at least one resistance band, cord, or cable is automatically wound when the one or more hand or wrist retainers to which the distal end of the at least one resistance band, cord, or cable is/are connected or linked move(s) toward the upper body harness or vest; and
    an automated resistance mechanism, directly or indirectly controlled by the app or other computer program, which automatically applies a resistance to the winding element or the at least one resistance band, cord, or cable when the one or more hand or wrist retainers to which the distal end of the at least one resistance band, cord, or cable is attached move forward, away from upper body harness or vest, into engagement with the image of the virtual opponent or object or the virtual image of the actual opponent.

2. The apparatus of claim 1 further comprising the image being a moving image of a virtual opponent.

3. The apparatus of claim 1 further comprising the portable or non-portable electronic device being a smart phone, a tablet, or a laptop.

4. The apparatus of claim 1 further comprising the at least one resistance band, cord, or cable being a resilient, stretchable band or cord.

5. The apparatus of claim 4 further comprising the resilient, stretchable band or cord being detachable and replaceable with a different resilient, stretchable band or cord having a greater or lesser degree of stretch resistance.

6. The apparatus of claim 1 further comprising the app or other computer program comprising machine learning or other artificial intelligence programming which (i) learns from the information transmitted by the one or more location or position sensors to directly or indirectly control the automated resistance mechanism to provide the simulated contact resistance and (ii) directly or indirectly controls the augmented reality, mixed reality, or virtual reality headset to provide the image of the virtual opponent or object or the virtual image of the actual opponent.

7. The apparatus of claim 1 further comprising the one or more hand or wrist retainers comprising a left hand or wrist retainer and a right hand or wrist retainer.

8. The apparatus of claim 7 further comprising an adjustable linking element extending between the left hand or wrist retainer and the right hand or wrist retainer which limits a distance which the left hand or wrist retainer can be separated from the right hand or wrist retainer.

9. The apparatus of claim 7 further comprising:
    the at least one resistance band, cord, or cable being a single resistance band, cord, or cable; and
    the distal end of the single resistance band, cord, or cable being connected to a linking member having a left end connected to the left hand or wrist retainer and a right end connected to the right hand or wrist retainer.

10. The apparatus of claim 7 further comprising the left hand or wrist retainer and the right hand or wrist retainer each comprising a band or loop which (i) is positionable around a left or a right wrist of the individual and (ii) has a thumb-receiving loop extending therefrom.

11. The apparatus of claim 7 further comprising the one or more location or position sensors comprising:
    at least one location or position sensor located on or in the upper body harness or vest;
    a location or position sensor located on or in the left hand or wrist retainer;
    a location or position sensor located on or in the right hand or wrist retainer;
    a location or position sensor positioned or positionable on the left foot or left ankle of the individual; and
    a location or position sensor positioned or positionable on the right foot or right ankle of the individual.

12. The apparatus of claim 11 further comprising the app or other computer program operating to automatically determine and store a record of relative position and spacing data for two or more of the upper body, the left hand or left wrist, the right hand or right wrist, the left foot or left ankle, and the right foot or right ankle of the individual.

13. The apparatus of claim 11 further comprising the app or other computer program operating to determine for the individual during the simulated exercise or the contest one or more of a speed, an acceleration, a force exerted, and/or a vertical jumping distance.

14. The apparatus of claim 11 further comprising the app or other computer program operating to determine whether a head impact would have occurred during the simulated exercise or the contest and a force of the head impact.

15. The apparatus of claim 11 further comprising the app or other computer program operating to determine during the simulated exercise or the contest a visual recognition rating and/or a memory processing rating for the individual.

16. The apparatus of claim 11 further comprising the app or other computer program operating to determine a head placement of the individual during the simulated exercise or the contest.

17. The apparatus of claim 11 further comprising the app or other computer program being operable to transmit the simulated exercise or the contest live, in a virtual setting, for viewing by one or more other individuals.

18. The apparatus of claim 11 further comprising the app or other computer program being operable to store and play back the simulated exercise or the contest, and to send a stored simulated exercise to others or to social media.

19. The apparatus of claim 11 further comprising:
pants or a belt and
weights which are removably attachable to or receivable by the pants or the belt.

20. The apparatus of claim 1 further comprising weights which are removably attachable to or receivable by the upper body harness or vest.

21. The apparatus of claim 1 further comprising:
a plurality of American football exercises for an offensive lineman which are programmed in the app or other computer program;
the American football exercises for the offensive lineman comprising at least one run blocking exercise, at least one pass blocking exercise, at least one punt kicking team exercise, and/or at least one field goal kicking team exercise; and
the app or other computer program providing an interactive menu for the portable or non-portable electronic device for selecting any one of the American football exercises.

* * * * *